United States Patent Office 2,928,756
Patented Mar. 15, 1960

2,928,756

PROCESS FOR COATING POLYETHYLENE WITH A HIGHER MELTING POLYOLEFINIC COMPOSITION AND ARTICLE THEREFROM

Paul E. Campbell, Bartlesville, Okla., assignor to Phillips Petroleum Company, a corporation of Delaware No Drawing. Application March 19, 1956
Serial No. 573,057

6 Claims. (Cl. 117—47)

This invention relates to hydrocarbon polymeric articles having improved heat resistance. In one of its more specific aspects, it relates to articles of thermoplastic hydrocarbon polymers coated with films of higher-melting polymers thereby to improve the heat resistance of the original articles. In another aspect, this invention relates to a method of coating these articles with the heat resistant film.

Many polymeric articles of the thermoplastic variety now in commercial production have limited utility because of their inability to withstand high temperatures. Conversely, there exist today thermoplastic hydrocarbon polymers which exhibit superior heat resistance but have not the flexibility of the lower-melting varieties.

I have now found a method of combining in one form, the properties of flexibility and high melting point to give a thermoplastic article with improved heat resistance; this method comprising coating a flexible hydrocarbon polymeric base article with a thin, adherent, continuous film of a hydrocarbon polymer having a substantially higher melting temperature than the base article.

By way of illustration, a preferred embodiment of this invention comprises a polyethylene base article manufactured by a high-pressure-temperature ethylene polymerization process on which has been applied in a thin film a continuous coating of polyethylene produced in a process utilizing a chromia-silica-alumina catalyst. In this case, the base article has a normal melting temperature in the range of 218 to 220° F., and the coating film has a melting temperature in the range of 240 to 260° F.

Quite unexpectedly, it was found that a surprisingly thin film of the higher melting polymer lends remarkable heat resistance to the lower melting base article without appreciably affecting its flexibility. In addition, it was found that certain surface properties, such as hardness and liquid impermeability, can be improved in the base article by applying a coating film as described. While the retention of flexibility in the final article is one advantage which can be enjoyed, it is recognized that this invention can be practiced without regard for that particular feature, as for example, by coating a relatively inflexible article in the manner described to improve its heat resistance.

It is an object of this invention to provide a hydrocarbon polymeric article with improved physical characteristics.

It is another object of this invention to provide a thermoplastic polymeric article which has improved heat resistance while retaining its flexibility.

It is still another object of this invention to provide a method for improving the heat resistance of hydrocarbon polymeric articles by coating them with polymeric films.

Various other objects, advantages and features of this invention will become apparent from the following detailed description:

A variety of hydrocarbon polymers can be employed to compose the base articles and the coating films of this invention. Essentially, it can be said that the following factors must be present for a proper combination:

(a) The coating polymer must have a substantially higher melting point than the polymer of the base article. This melting temperature differential is generally at least 10° F.

(b) The coating polymer must be capable of forming an adherent bond with the base polymer.

(c) The coating and base polymers must have similar coefficients of expansion so that the bond, once formed, will not be destroyed by temperature fluctuations.

Preferred materials for the practice of this invention are homopolymers and copolymers of ethylene. These copolymers can be prepared from ethylene and one or more unsubstituted mono-olefins, preferably 1-olefins of from 3 to 8 carbon atoms, such as ethylene-propylene copolymer, ethylene-butene-1 copolymer, and the like.

The ethylene polymers form the preferred materials for this invention because within this class exists polymeric compositions with a wide disparity in melting points. Likewise, within this class, the advantages to be ganed by this invention are particularly applicable. For example, commercial polyethylene manufactured by high pressure-high temperature processes exhibits a relatively low melting point, softening in the range of 218 to 220° F. This product, however, is quite flexible. Since standard sterilization autoclaves operate at about 250 to 260° F., it is desirable to produce polymeric articles capable of withstanding these temperatures. Improved polyethylenes are now available which possess melting points as high as 240 to 260° F. Recognized as preferred among these are the polyethylenes polymerized in the presence of a chromia-silica-alumina catalyst at temperatures in the range of 150 to 450° F. and pressures ranging from atmospheric to as high as 700 pounds per square inch or higher. Also within the scope of this invention are the polyethylenes produced by processes using a metal alkyl-titanium tetrachrolide or similar catalyst system. Thus, a low-melting polyethylene can be used for the base article of this invention, and the higher melting polyethylene as above-described, forms a suitable coating material.

In the preferred embodiment of this invention, the base article comprises polyethylene having a melting temperature of about 220° F., or slightly less. This polyethylene can be produced by polymerizing ethylene at temperatures usually in the range of 100 to 400° C., and with pressures of at least 500 atmospheres and up to about 3000 atmospheres. These processes are well known in the art as are the methods for forming the polyethylene into useful articles. The Shore "D" hardness of this type of polyethylene is usually around 40. This base polyethylene is formed in the shape of the desired final article, and the thin film of coating polyethylene is then applied.

The preferred coating material is a polyethylene having a melting temperature in the range of 240 to 260° F. Other characteristics of this polyethylene are a Shore "D" hardness of about 60 to 65, a crystallinity of at least 70 percent and a density of about 0.94 gram per cubic centimeter or above. A preferred method of preparing this type of polyethylene comprises briefly, the polymerization of ethylene in the presence of a chromia-silica-alumina catalyst at temperatures in the range of 150 to 450° F., and pressures ranging from atmospheric to as high as 700 pounds per square inch or higher. The coating polymers of ethylene can also be produced by processes utilizing a metal alkyl-titanium tetrachloride or similar catalyst systems, as well as by other processes known in the art.

The thickness of the coating film is preferably in the range of 0.5 to 10 mils, depending on the physical properties which are required in the coated article of manufacture. The maximum thickness of the film can be greater than 10 mils and, in one respect, is limited only by the degree of flexibility which is desired to be retained in the final article. The coating film on the final article should comprise from 1 to 20 percent of the total thickness of the base material plus the coating. In preparing the article for improved heat resistance, both sides of all members should be coated in order to prevent any exposure of the low melting base material. Likewise, the coating should provide a continuous film over the entire article in order to prevent any possible deformation of softened base material during periods when the article is exposed to temperatures above the melting point of the base.

In the preferred method of applying the film of protective polymer to the base article, a hot solution of the coating polymer is prepared. The article to be coated is then preheated to the approximate temperature of the coating solution and then dipped, sprayed, or contacted by other suitable means with the hot polymer solution so that a continuous coating is effected. The article is then dried to form the protective film thereon. The coating solution should be applied at temperatures above the polymer solution cloud point and below the softening temperature of the article to be coated; in the case of polyethylene, this would generally be in the range of 175 to 220° F. Any solvent is suitable which will give a polymer solution cloud point below the softening temperature of the article to be coated. Examples of such solvents for polyethylene are toluene, benzene, xylene, methylcyclohexane, hexane, and carbon tetrachloride. The concentration of polyethylene in its coating solution is generally in the range of 0.1 to 10 weight percent at the coating temperature, although higher concentrations can be used if the solution cloud point is not too high.

The article to be coated is preheated to the approximate temperature of the coating solution, but below its own softening temperature. The article is then coated in any suitable manner, such as by dipping it in hot polymer solution, spraying, or the like. It is preferable to dry the article at a temperature within the range of that specified for the coating operation; this can be done in a vacuum oven. Between the coating operation and the drying step, the coated article should not be permitted to cool below the temperature at which the coating was applied; for, if this occurs, the higher melting polymer can precipitate on the surface of the article as a powder and be easily removed.

Another method for applying a protective film is by fusion of the higher melting polymer to the surface of the lower melting base article using a carefully controlled heat source. In one method which is applicable, the higher melting polymer is applied to the base article in a finely divided form and then fused into a continuous protective film under carefully controlled conditions.

After one coating has been applied to the article as described above, an additional coating can be applied if so desired. It is estimated that one dip coating in about a 5 weight percent polymer solution will apply a film of about one mil in thickness to the base article. This coating is effective in raising the softening point of polyethylene article, as the examples will illustrate. Additional coatings will yield an article which will not deform in any way when subjected to temperatures above the melting point of the base article and below the melting temperature of the protective film.

While this invention has been described in connection with present, preferred embodiments thereof, it is understood that this description, including the examples below, is illustrative only and is not intended to limit the invention.

EXAMPLES

Example I

A polyethylene was prepared by the continuous catalytic polymerization of ethylene at 285° F. and 420 pounds per square inch gauge in a reactor equipped with a mechanical stirrer. A chromia-silica-alumina catalyst was used having a total chromium content of 2.33 weight percent. The polymer concentration in the reactor was 8.0 weight percent and the reaction time was 4.2 hours. Cyclohexane was employed as a diluent and solvent in the system. Some of the physical properties of this polyethylene are tabulated in Table I.

TABLE I

| | |
|---|---|
| Polymer, molecular weight | 42,750 |
| Melt index, grams extruded per 10 minutes [1] | 0.810 |
| Density, grams per cubic centimeter | 0.958 |
| Melting point, ° F. | 252±2 |

[1] ASTM-D-1238-52T (temperature=374° F.; loading= 2160 grams).

A 5 weight percent solution of this polyethylene was prepared using toluene as the solvent at 212 to 230° F. A small compression molded cup made of a commercial polyethylene manufactured by high pressure polymerization processes and having a softening point of about 218 to 220° F. was dipped into this solution. After one dip, the cup was vacuum dried at 158° F. for two hours. The higher melting point polyethylene precipitated on the cup. This coating of high melting polyethylene was fused into a continuous film on the cup by using a carefully controlled flame. This cup and an untreated cup of like manufacture, as a control, were placed in an autoclave and heated with steam at 15 pounds per square inch gauge. The uncoated cup collapsed completely, whereas the coated cup showed only slight distortion.

Example II

A 5 weight percent solution of the high melting polyethylene was prepared as described in Example I using xylene as the solvent at 212 to 230° F. A cup made of the same commerical polyethylene used in Example I was preheated in an oven maintained at about 221° F. and treated by dipping it once in the coating solution. This cup was then dried while maintaining the oven temperature at about 221° F. When the cup had dried, the continuous film of the higher melting polyethylene had formed on the base article in a smooth, uniform coating, superior to the film formed in Example I.

It is readily apparent from the above examples that an improvement in heat resistance can be effected for a relatively low melting polymer article by coating thereon in a thin but continuous film a polymer having similar physical properties but a substantially higher melting temperature.

I claim:

1. A process for coating an article formed from polyethylene having a melting temperature of about 220° F. and prepared in a process employing pressures of about 500 to 3000 atmospheres to impart improved physical characteristics thereto comprising forming a solution of a polymer selected from the group consisting of polyethylene, ethylene/propylene copolymer and ethylene/butene-1 copolymer having a melting point of about 240 to 260° F. and a density not less than 0.94 gram per cubic centimeter prepared in a catalytic process employing pressures of about atmospheric to 700 pounds per square inch in a solvent which will give a polymer solution cloud point below about 220° F.; heating said solution to a temperature above its cloud point and below about 220° F.; pre-heating said article to the approximate temperature of said solution; applying said solution thus heated to the surface of said article before cooling thereof; and drying said article at a temperature above the cloud point of said solution and below about 220° F.

to form a continuous film of said higher melting polymer on the lower melting point polyethylene article.

2. A process according to claim 1 wherein the thickness of said film is in the range of about 0.5 to 10 mils and comprises from about 1 to 20 percent of the total thickness of the base plus the coating.

3. The process of claim 1 wherein said higher melting polymer is polyethylene.

4. An article of manufacture comprising a substantial base in the shape of said article formed from polyethylene having a melting temperature of about 220° F. prepared in a process employing pressures of about 500 to 3000 atmospheres and a continuous film covering and adhering to said base, said film having a thickness in the range of about 0.5 to 10 mils and formed from polymer selected from the group consisting of polyethylene, ethylene/propylene copolymer and ethylene/butene-1 copolymer having a melting temperature of about 240 to 260° F. and a density not less than 0.94 gram per cubic centimeter prepared in a catalytic process employing pressures of about atmospheric to 700 pounds per square inch.

5. The article of claim 4 wherein said film is polyethylene.

6. The article of claim 4 wherein said film has a thickness of about 1 to 20 percent of the total thickness of the base plus the coating.

References Cited in the file of this patent

UNITED STATES PATENTS

| | | |
|---|---|---|
| 2,429,861 | Woodbridge | Oct. 28, 1947 |
| 2,622,056 | De Coudres | Dec. 16, 1952 |
| 2,628,172 | Jenett | Feb. 10, 1953 |
| 2,639,998 | Pavlic | May 26, 1953 |

OTHER REFERENCES

"The New Polyethylenes," Modern Plastics, 32, 117–120, 122, August 1955.